US 6,604,515 B2

(12) United States Patent
Marsh et al.

(10) Patent No.: US 6,604,515 B2
(45) Date of Patent: Aug. 12, 2003

(54) TEMPERATURE CONTROL FOR TURBOCHARGED ENGINE (75) Inventors: Gregory A. Marsh, Erie, PA (US); Brian L. Walter, Erie, PA (US); Peter L. Valentine, Erie, PA (US); Mahesh C. Aggarwal, Erie, PA (US); Robert A. Armbruster, Jr., Erie, PA (US); Vinh K. Do, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/050,288

(22) Filed: Jan. 16, 2002

(65) Prior Publication Data
US 2002/0195090 A1 Dec. 26, 2002

Related U.S. Application Data
(60) Provisional application No. 60/299,660, filed on Jun. 20, 2001.

(51) Int. Cl.$^7$ .......................... F02B 33/00; F02B 29/04; F01P 7/14
(52) U.S. Cl. ................ 123/563; 60/599; 123/41.31; 123/41.33; 123/41.44
(58) Field of Search ............................. 123/563, 41.44, 123/41.31, 41.33; 60/599

(56) References Cited

U.S. PATENT DOCUMENTS

| | | | |
|---|---|---|---|
| 3,863,612 A | | 2/1975 | Wiener |
| 4,236,492 A | * | 12/1980 | Tholen ........................ 123/563 |
| 4,317,439 A | * | 3/1982 | Emmerling .................. 123/563 |
| 5,036,668 A | * | 8/1991 | Hardy ......................... 60/599 |
| 5,201,285 A | | 4/1993 | McTaggart |

(List continued on next page.)

FOREIGN PATENT DOCUMENTS

GB    2055963 A  *  3/1981  ........... F02B/33/44

OTHER PUBLICATIONS

Moranne, Jean–Pierre, et al. Air–to–air turbocharged air cooling versus air–to–water turbocharged air cooling. SAE Technical Paper Series 840351, International Congress & Exposition, Detroit, Michigan, Feb. 27–Mar. 2, 1984, Warrendale, PA, SAE.

Nutt, R.A.. et al. Cooling system requirements for advanced diesel engines. SAE Technical Paper Series 820984, West Coast International Meeting, San Francisco, CA, Aug. 16–19, 1982. Warrendale, PA, SAE.

Bond, Gregory, et al. Selection of the optimized aftercooling system for Cummins Premium Diesel Engines. SAE Technical Paper Series 841023. West Coast International Meeting & Exposition, San Diego, CA, Aug. 6–9, 1984.

Primary Examiner—Sheldon J. Richter
(74) Attorney, Agent, or Firm—Carl Rowald; David G. Maire; Beusse Brownlee Bowdoin & Wolter, P.A.

(57) ABSTRACT

A cooling apparatus (10) and method for a turbocharged internal combustion engine (12). The combustion air (16) exiting a turbocharger (18) is passed over an air-to-water intercooler (40) then over an air-to-air intercooler (42) for heat exchange with liquid coolant and with ambient air (32) respectively. During periods of low ambient air temperature, the combustion air may be directed through a bypass duct (80) around the air-to-air intercooler, and further, may be heated by the coolant in the air-to-water intercooler. A multi-speed fan (44) and/or shutters (48) may be used to control the flow of ambient air across the air-to-air intercooler. A cooling duct (68) provides a flow of ambient air to the fan motor (46) during periods of operation when the flow of ambient air over the air-to-air heat exchanger is restricted by the shutters. Coolant exiting a subcooler (28) has the lowest temperature in the system and is directed to a lube oil cooler (34) for engine lubricant cooling.

30 Claims, 5 Drawing Sheets

U.S. PATENT DOCUMENTS

| | | |
|---|---|---|
| 5,392,741 A | 2/1995 | Uzkan |
| 5,415,147 A | 5/1995 | Nagle et al. |
| 5,544,486 A | 8/1996 | Lu |
| 5,547,019 A | 8/1996 | Iacullo |
| 5,598,705 A | 2/1997 | Uzkan |
| 5,605,045 A | 2/1997 | Halimi |
| 5,657,630 A | 8/1997 | Kjemtrup |
| 5,669,311 A | 9/1997 | Hill et al. |
| 5,669,338 A | 9/1997 | Pribble |
| 5,669,363 A | 9/1997 | Francis |
| 5,809,981 A | 9/1998 | Berg-Sonne |
| 5,871,001 A | 2/1999 | Pelkey |
| 5,910,099 A | 6/1999 | Jordan, Jr. |
| 6,003,500 A | 12/1999 | Packard |
| 6,006,731 A | 12/1999 | Uzkan |
| 6,027,311 A | 2/2000 | Hill |
| 6,050,082 A | 4/2000 | Leonard |
| 6,098,576 A | 8/2000 | Nowak, Jr. et al. |
| 6,116,026 A | 9/2000 | Freese |
| 6,145,480 A | 11/2000 | Betz |
| 6,158,398 A | 12/2000 | Betz |
| 6,158,399 A | 12/2000 | Ash |
| 6,196,167 B1 | 3/2001 | Marsh et al. |
| 6,220,207 B1 | 4/2001 | Kawasaki |
| 6,230,668 B1 | 5/2001 | Marsh et al. |
| 6,286,311 B1 | 9/2001 | Chen |
| 6,327,980 B1 | 12/2001 | Chen et al. |
| 2001/0023588 A1 * | 9/2001 | Furukawa et al. ............ 60/599 |
| 2002/0011242 A1 * | 1/2002 | Ruppel et al. ................ 60/599 |

* cited by examiner

FIG. 6 ns. Such engines are designed with water jackets and/or
TEMPERATURE CONTROL FOR TURBOCHARGED ENGINE

CROSS REFERENCE TO RELATED APPLICATION

This application claims benefit of the Jun. 20, 2001 filing date of provisional U.S. patent application Ser. No. 60/299,660.

FIELD OF THE INVENTION

This invention relates generally to the field of internal combustion engines, and more particularly to turbocharged internal combustion engines, and specifically to a method and apparatus for cooling a turbocharged locomotive engine.

BACKGROUND OF THE INVENTION

Internal combustion engines such as the turbocharged diesel engines utilized for rail locomotives require cooling systems to limit the temperatures of various engine components. Such engines are designed with water jackets and/or internal cooling passages for the circulation of a water-based coolant to remove heat energy from the engine components such as the block and cylinder heads. Lubricating oil is circulated throughout the engine to reduce friction between moving parts and to remove heat from components such as the pistons and bearings. The lubricating oil must be cooled to maintain its lubricity and to extend the interval between oil changes. Some internal combustion engines utilize turbochargers to increase engine power output by compressing the intake combustion air to a higher density. Such compression results in the heating of the combustion air, which must then be cooled prior to entering the combustion chamber to enable the engine to have high volumetric efficiency and low emissions of exhaust pollutants. For mobile applications such as rail locomotives, it is known to use a pumped cooling medium such as water to transport heat to finned radiator tubes. The radiator tubes then transfer the heat to the ambient air, often using forced convection provided by a fan. One such system is described in U.S. Pat. No. 6,230,668 issued to Marsh, et al. and assigned to the assignee of the present invention. The cooling system described therein includes a two stage intercooler for conditioning the combustion air entering the engine. A first coolant loop includes a first stage intercooler and a second coolant loop includes a second stage intercooler. This two stage system provides an improved level of control for maintaining the engine, lubricating oil and combustion air temperatures within respective limits without excessive fan cycling.

The Environmental Protection Agency of the United States has established Tier 2 guidelines for emissions from locomotives utilizing a diesel engine as the prime mover power plant. The Tier 2 guidelines require a significant reduction in nitrous oxide (NOx) emissions from levels that are currently being achieved. A reduction in NOx generation can be achieved if the manifold air temperature (MAT) of the combustion intake air is maintained in a range of 110 to 125 degrees Fahrenheit. However, locomotives operate in extreme ambient temperature conditions (−40 to +120° F.) and with transient power changes from 20 hp to 6250 hp in one minute. Tunnel operation may present ambient temperatures of up to 300° F. for 20 minutes. Such operating conditions can cause turbocharger compressor outlet temperatures to approach 500° F. As a result, modern locomotives utilizing exhaust gas driven turbocharged diesel engines currently operate with a MAT of between 145 to 220° F.

Means for lowering manifold air temperature (MAT) have been incorporated in turbocharged piston engine powered vehicles for many decades. Lowering MAT can increase the power available from a given size engine and/or increase the durability of the engine at very high power loads by limiting the temperatures to which components, such as aluminum pistons, are exposed. For light weight vehicles such as piston powered military aircraft and racing automobiles, the need is usually for a large reduction in MAT for a short period of time. For such applications it has been feasible to carry a small amount of water which is injected into the hot intake air when needed. The injected water changes to steam due to the high temperature, thereby absorbing heat and lowering the intake charge temperature. For heavy mobile vehicles such as turbocharged diesel powered locomotives, which are designed to produce a maximum power output for an indefinite amount of time, it originally sufficed to use water based coolant circuits to transport the heat from an intercooler to a fan cooled radiator, with the coolant from the radiator used for both engine and intercooler alike. In order to cool MAT further and to produce more power from a given engine, U.S. Pat. No. 5,145,147 describes a split cooling system that produces colder water for the intercoolers than for the engine. U.S. Pat. No. 6,098,576 describes an enhanced split system that produces colder water for the oil cooler than for the engine.

Further reductions in NOx emissions are being required worldwide on prime movers such as ships, land vehicles, and stationary power plants. In the case of stationary power plants and ships utilizing diesel engines, it is still possible in many cases to meet reduced NOx limits with water based cooling systems that exchange heat to the environment using river, lake, or ocean water that rarely exceeds 80 F. However, this approach is not practical for a locomotive due to the need to haul the supply of water along with the train.

BRIEF SUMMARY OF THE INVENTION

Accordingly, an improved cooling system and method of cooling a turbocharged land vehicle engine is needed.

An apparatus for conditioning a flow of combustion air being supplied to the intake of an internal combustion engine is described as including: an air-to-liquid heat exchanger disposed in the flow of combustion air for heat exchange between the combustion air and a liquid coolant; and an air-to-air heat exchanger disposed in the flow of combustion air downstream of the air-to-liquid heat exchanger for heat exchange between the combustion air and ambient air. The apparatus may include a flow control element for selectively bypassing at least a portion of the combustion air to the engine intake around the air-to-air heat exchanger. The apparatus may further include: a coolant circuit for delivering liquid coolant to the air-to-liquid heat exchanger; and wherein the coolant circuit comprises a control element for selecting the liquid coolant delivered to the air-to-liquid heat exchanger to be of a predetermined temperature relationship to that of the combustion air entering the air-to-liquid intercooler. The apparatus may include: a motor powered fan for moving ambient air through the air-to-air heat exchanger; and a flow path for supplying ambient air to the motor to ventilate the motor along a path other than that through the air-to-air heat exchanger.

A cooling system for an internal combustion engine is described as including: a liquid coolant circuit comprising an air-to-liquid intercooler for providing heat exchange between a liquid coolant and a flow of combustion air being supplied to an intake of an internal combustion engine; and an air-to-air intercooler disposed within the flow of combustion air downstream of the air-to-liquid intercooler for providing heat exchange between the flow of combustion air and ambient air. The liquid coolant circuit may further include at least one valve for controlling the liquid coolant delivered to the air-to-liquid intercooler to have a predetermined temperature relationship with the combustion air entering the air-to-liquid intercooler. The cooling system may further include: a fan motor disposed downstream of the air-to-air intercooler for driving a fan for forcing a flow of ambient air through the air-to-air intercooler; and a duct for supplying a flow of ambient air to ventilate the fan motor along a flow path other than that through the air-to-air intercooler.

A method of conditioning the combustion air being supplied to an internal combustion engine is described herein as including: directing compressed combustion air from a turbocharger to an air-to-liquid heat exchanger for heat exchange with a liquid coolant of an engine cooling system; and directing the compressed combustion air from the air-to-liquid heat exchanger to an air-to-air heat exchanger for heat exchange with ambient air. The method may include selectively bypassing the compressed combustion air around the air-to-air heat exchanger. The method may further include: forcing ambient air through the air-to-air heat exchanger with a suction fan driven by a suction fan motor; and providing cooling air to ventilate the suction fan motor along a flow path other than that through the air-to-air heat exchanger.

An internal combustion engine is described as including: an intake manifold for receiving combustion air into an engine; a coolant loop for circulating coolant for heat exchange between the engine and ambient air; an air-to-liquid intercooler having a combustion air side forming a first portion of a flow path of the combustion air to the intake manifold and having a liquid side forming a portion of the coolant loop for heat exchange between the combustion air and the coolant; and an air-to-air intercooler having a combustion air side forming a second portion of the flow path of the combustion air disposed downstream of the first portion and having an ambient air side for heat exchange between the combustion air and ambient air.

BRIEF DESCRIPTION OF THE DRAWINGS

The features and advantages of the present invention will become apparent from the following detailed description of the invention when read with the accompanying drawings. Similar components depicted in multiple figures may be numbered consistently among the figures.

DETAILED DESCRIPTION OF THE INVENTION

Figure 1:
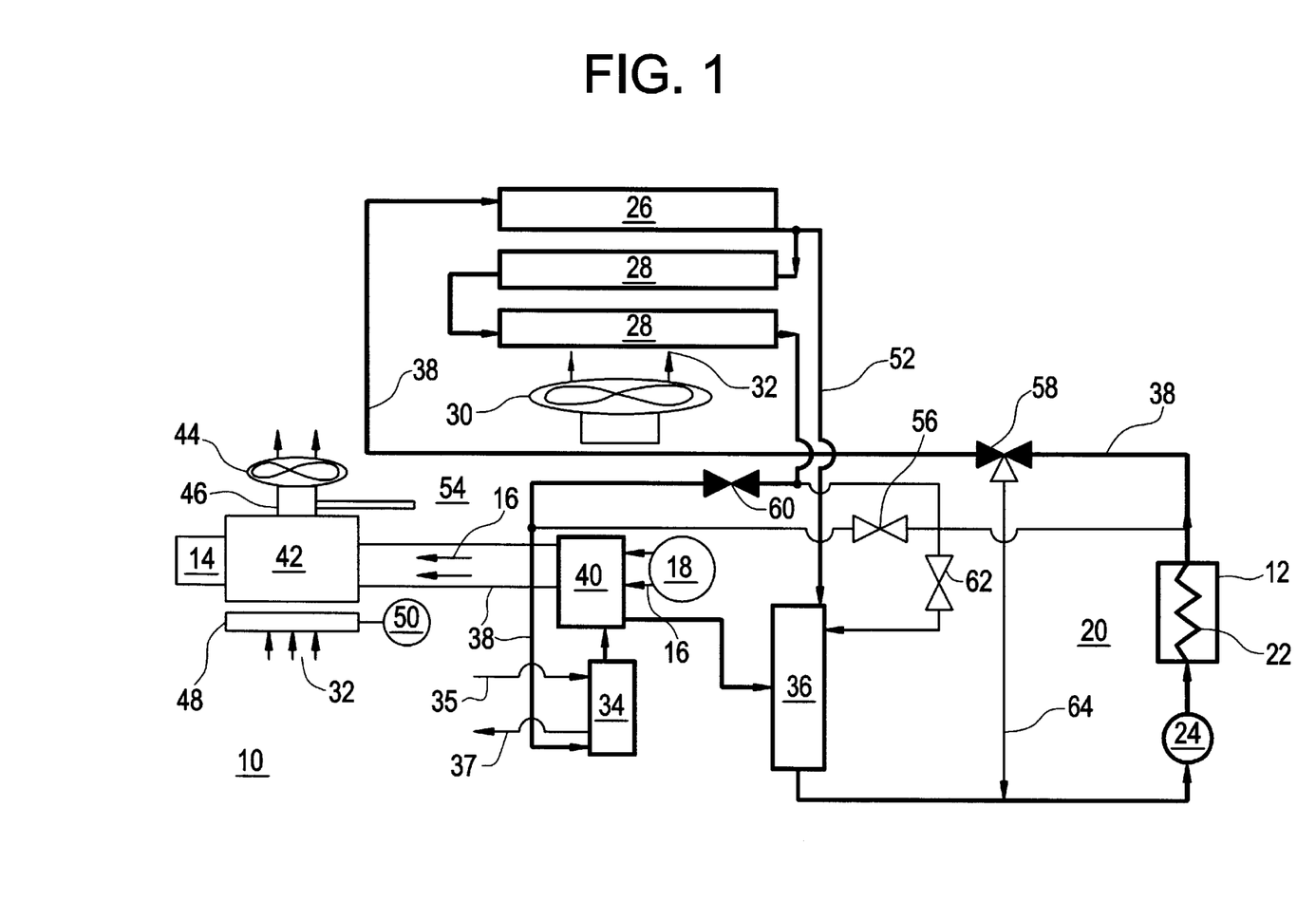
FIG. 1 is a schematic illustration of a cooling apparatus for a turbocharged internal combustion engine configured for Mode 1 operation.

FIG. 1 is a schematic illustration of an improved cooling apparatus 10 for a turbocharged internal combustion engine 12, such as may be utilized on a rail locomotive. The engine 12 includes an intake air manifold 14 for receipt of compressed combustion air 16 from a turbocharger 18. Such a system may have application to naturally-respirated engines, but it is especially advantageous when applied to a turbocharged engine 12 due to the increased temperature generated in the combustion air 16 by the action of the turbocharger 18. The cooling apparatus 10 includes a coolant loop or coolant system 20 for the circulation of a liquid coolant, typically water with chemical additives such as anti-freeze and corrosion inhibitors. The engine 12 includes internally formed cooling passages and/or a water jacket 22 for placing the coolant in a heat-exchange relationship with the engine 12. A pump 24 is used to circulate the coolant throughout the coolant system 20, which also includes the tube side at least one radiator 26 and subcooler 28. A motor-driven radiator fan 30 drives ambient air 32 across the respective shell sides of the subcooler 28 and radiator 26 in sequential order. Coolant is also provided to a plate heat exchanger lube oil cooler 34 that includes connection 35 for receiving lubricating oil from the engine 12 and connection 37 for returning lubricating oil to the engine 12. A coolant collection tank such as water tank 36 is used to store an inventory of coolant to capture the available volume of coolant as various portions of the coolant system 20 is placed into and out of service. Water tank 36 also provides for the expansion and contraction of the coolant as the operating temperatures of the cooling apparatus 10 vary. The coolant system 20 also includes piping 38 for interconnecting the various components of the system and associated valves, as will be described more fully below with regard to the operation of the cooling apparatus 10.

Cooling apparatus 10 further includes an air-to-water intercooler 40 and air-to-air intercooler 42 for conditioning the combustion air 16 after it is compressed by the turbocharger 18 and before it enters the combustion chambers of the engine 12. The term intercooler is used herein to describe a heat exchanger used to condition the compressed combustion air 16 exiting the turbocharger 18 prior to its introduction into engine 12. The term air-to-water is used since most applications will involve a water-based liquid coolant including appropriate additives such as anti-freeze, anti-corrosion agents, etc. The invention described herein may be implemented with any type of air-to-liquid intercooler, including the air-to-water intercooler 40 described. The air-to-air intercooler 42 is positioned downstream of the air-to-water intercooler 40 within the flow stream of the combustion air 16. The tube side of the air-to-water intercooler 40 forms a part of the coolant system 20 and is provided with coolant from the lube oil cooler 34. The air-to-air intercooler 42 provides heat exchange between the combustion air 16 and ambient air 32. The ambient air is delivered by the operation of suction fan 44 powered by motor 46 and disposed downstream of the air-to-air intercooler 42 within the flow stream of the ambient air 32. The ambient air 32 is provided to the air-to-air intercooler 42 through intake shutters 48 that can be moved to any one of a plurality of positions by a shutter actuator 50 in order to control the flow of ambient air 32 through the air-to-air intercooler 42.

FIG. 1 shows the cooling apparatus 10 configured for the maximum cooling conditions of full horsepower engine operation and high (80° F.) ambient temperature. Full speed and full horsepower engine operation is known as "Notch 8, full load", and the cooling system configuration for maximum cooling is known as "Mode 1" in locomotive parlance. The coolant flow path in this configuration is indicated by bold lines, whereas piping 38 and components that are not actively carrying coolant are illustrated in normal line width. Engine 12 is cooled by coolant drawn from tank 36 by pump 24 and circulated through water jacket 22. In one modeled example, the coolant enters the engine 12 at about 185° F. and leaves the engine 12 at about 195° F. All of the heated coolant is then directed into radiator 26 where it is cooled to about 185° F. A first portion of the coolant is returned to tank 36 through conduit 52 while a second portion of the coolant is directed through subcooler 28 where it is further cooled to about 110° F. The relative flow rates through the two flow paths of this split-flow system may be, for example, 170–230 gpm through the subcooler 28 and 360–530 gpm through conduit 52. Coolant leaving subcooler 28 is the lowest temperature coolant available within coolant system 20. This low temperature coolant is advantageously directed into lube oil cooler 34 to lower the lubricant temperature to the lowest possible level while still using liquid coolant to remove heat from the lube oil cooler 34. A lower lubricant temperature will result in improved piston and bearing performance within the engine and a longer lubricant life between changes due to reduced oil breakdown resulting from high temperatures. A direct oil-to-air heat exchanger could be used to provide an even lower oil temperature. However, oil-to-air heat exchangers have the potential of becoming plugged due to low oil viscosity during periods of low engine power and low ambient temperature Such plugging is avoided in the embodiment illustrated in FIG. 1 due to the thermal inertia of the coolant. Furthermore, oil-to-water lube oil cooler 34 has the ability to become an oil heater during low ambient and startup conditions, as will be described more fully below with respect to FIGS. 2 and 3.

Coolant leaving the lube oil cooler 34 is directed to the air-to-water intercooler 40. Under Mode 1 conditions, the coolant will be provided to the air-to-water intercooler 40 at a temperature that is lower than the temperature of the compressed combustion air 16 entering the air-to-water intercooler 40. The coolant cools the compressed combustion air 16 from about 450° F. to about 220° F. before being returned to tank 36. In order to minimize the generation of oxides of nitrogen during the combustion process, it is desired to maintain the manifold air temperature (MAT) of the combustion intake air 16 in a range of 110–125° F. The maximum MAT of 125° F. should be achieved with an ambient air temperature of up to 105° F. and at an altitude of up to 1,000 feet above sea level. Accordingly, the combustion air 16 is further cooled in the air-to-air intercooler 42 to achieve a combustion air MAT of about 120° F. with the shutters 32 in their full open position. The hybrid intercooler 54 including both the air-to-water intercooler 40 and the air-to-air intercooler 42 provides several advantages when compared to prior art designs which use only air-to-water or only air-to-air heat exchangers. The hybrid intercooler 54 uses ambient air 32 to provide a maximum temperature differential for driving the temperature of the combustion air 16 to a lowest value possible without an active refrigeration system, since the ambient air 32 is the ultimate heat sink for a mobile vehicle. The hybrid intercooler 54 provides this degree of cooling in a smaller package size than would otherwise be possible with an all-air intercooler. The hybrid intercooler 54 also has the ability to heat the combustion air 16 using heat from the liquid coolant during periods of low ambient temperature or low engine load, as described more fully below with respect the FIGS. 2 and 3.

Figure 2:
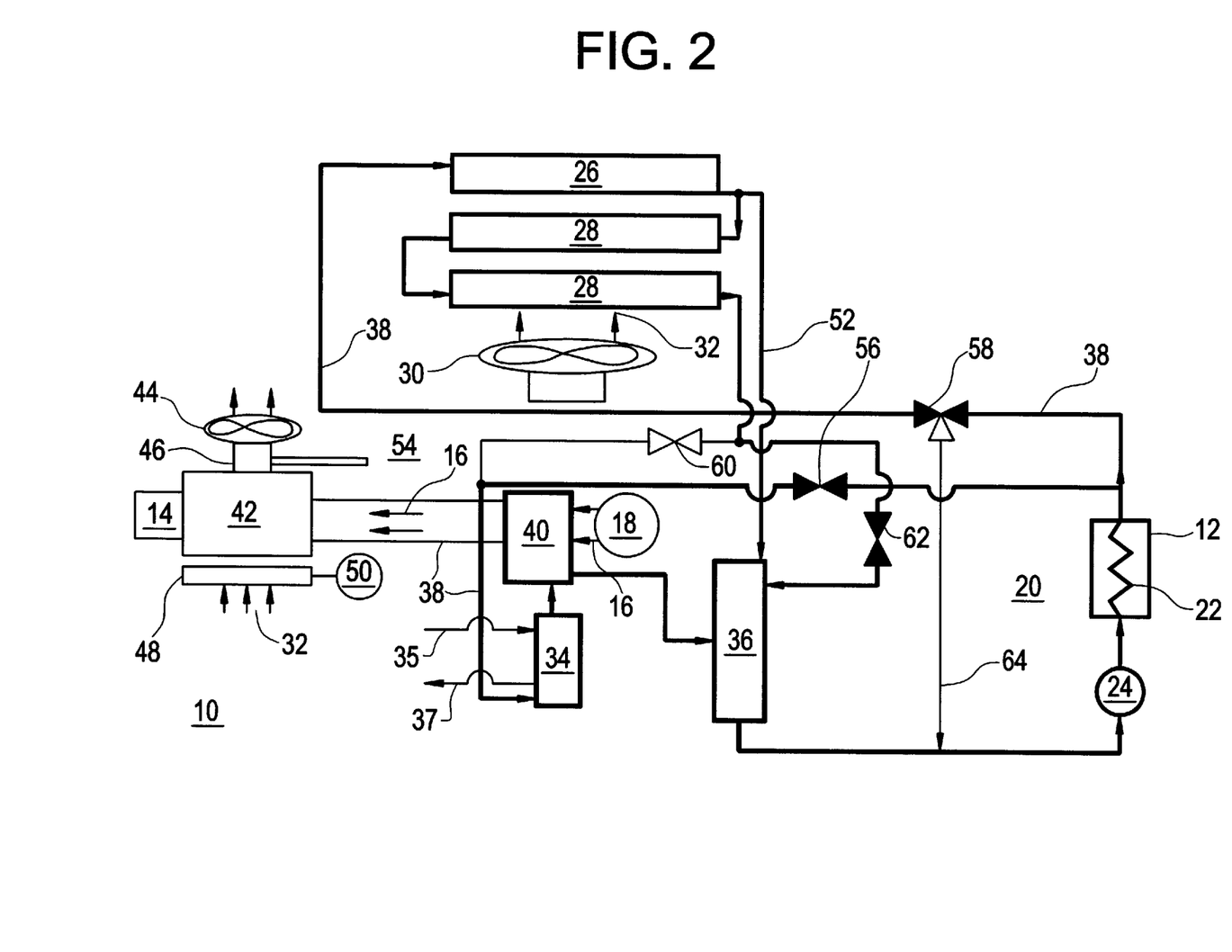
FIG. 2 is a schematic illustration of the cooling apparatus of FIG. 1 configured for Mode 2 operation.

FIG. 2 illustrates the cooling apparatus 10 configured for higher engine power levels during lower ambient air temperature operation, also known as Mode 2. In this configuration, the engine 12 requires a degree of heat removal sufficient to require the use of radiators under conditions where the manifold air temperature may naturally fall below the preferred range for optimal engine performance. To accommodate these conditions, valve 56 is opened so that a first portion of the heated coolant leaving the engine water jacket 22 is directed in series to the lube oil cooler 34 and to the air-to-water intercooler 40. A second portion of the heated coolant is directed through valve 58 to the radiator 26 and subcooler 28. As in Mode 1 of FIG. 1, a portion of the coolant leaving the radiator 26 is returned to the water tank 36. In addition, valves 60, 62 are aligned to return the coolant leaving the subcooler 28 directly to the water tank 36. In Mode 2, the flow rates through the radiator 26 and subcooler 28 are less than in Mode 1. However, the full cooling capacity of both the radiator 26 and the subcooler 28 are made available for cooling of the engine, thereby providing an adequate level of cooling for the engine 12. Advantageously, in this Mode of operation, the temperature of the coolant being supplied to the air-to-water intercooler 40 is higher than the temperature of the compressed combustion air 16 being supplied to the air-to-water intercooler 40. Thus the liquid coolant delivered to the air-to-water intercooler 40 may be of a predetermined temperature relationship to that of the combustion air entering the air-to-water intercooler, i.e. either cooler or warmer than the combustion air, depending upon the mode of operation of the system 10. Heat from the engine 12 is delivered to the intake combustion air 16 through the air-to-water intercooler 40, thereby keeping the MAT within a desired range. In this Mode, the shutter actuator 50 may be controlled to reduce or to eliminate the flow of ambient air 32 across the air-to-air intercooler 42 in order to maintain a desired MAT.

Figure 3:
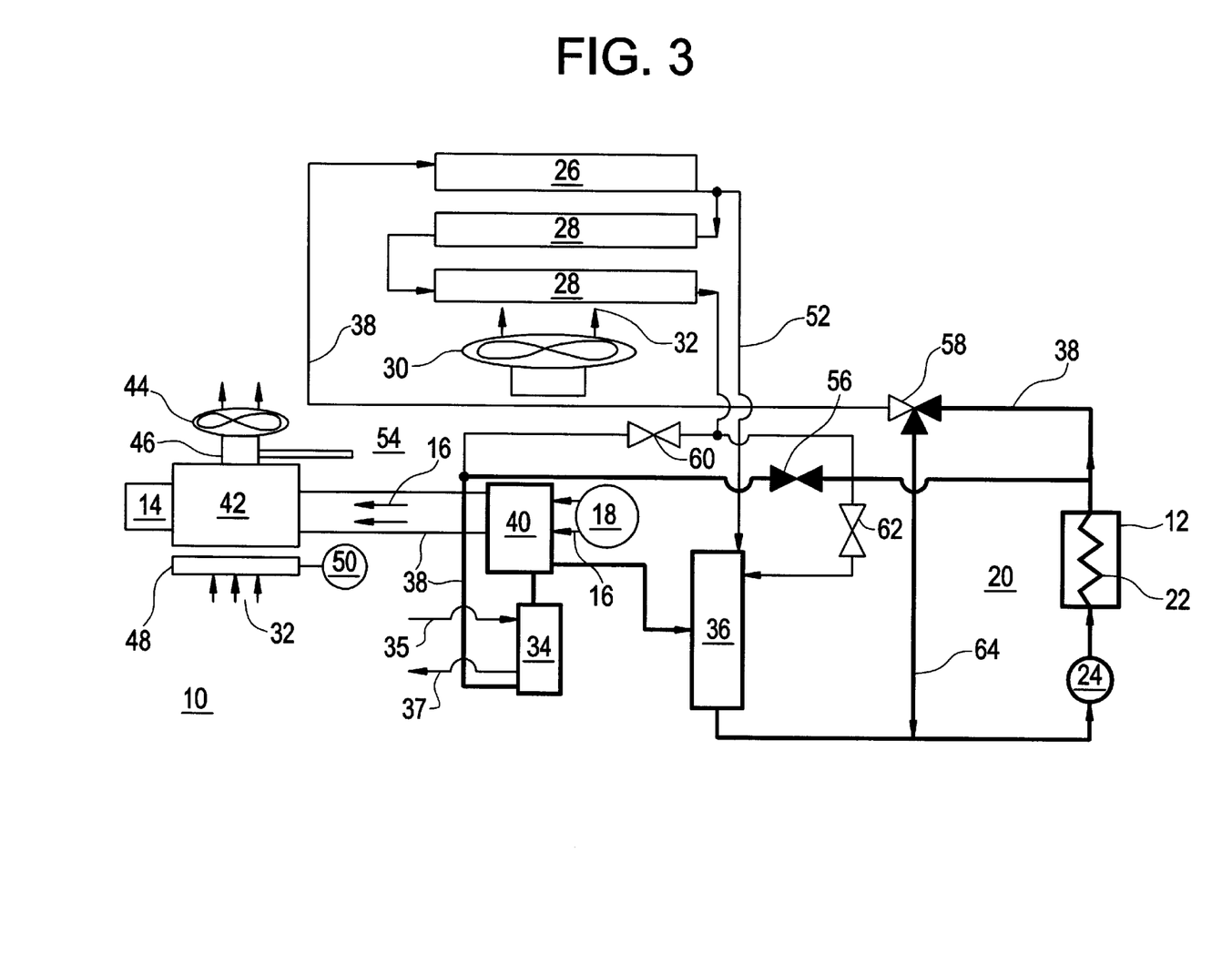
FIG. 3 is a schematic illustration of the cooling apparatus of FIG. 1 configured for Mode 3 operation.

FIG. 3 illustrates the cooling apparatus 10 configured for low engine power, low ambient air temperature operation, also known as Mode 3. In this configuration, the engine 12 requires a reduced degree of heat removal, and the manifold air temperature may naturally fall below the preferred range for optimal engine performance. To accommodate these conditions, valve 58 is positioned to prevent the flow of coolant to the radiator 26 and subcooler 28, instead directing a first portion of the heated coolant leaving engine 12 through radiator bypass line 64. The remaining portion of the heated coolant leaving engine 12 is directed through valve 56 to the lube oil cooler 34 and the air-to-water intercooler 40, in series, and then back to tank 36. Heat from engine 12 is thereby used to warm both the intake combustion air 16 and the engine lubricant, allowing the engine to be warmed up quickly from cold conditions and/or to operate at low power and low ambient temperature while still maintaining proper combustion and lubrication conditions. Furthermore, the heat provided by the coolant will prevent the clogging of lubricant within the lube oil cooler 34.

Figure 4:
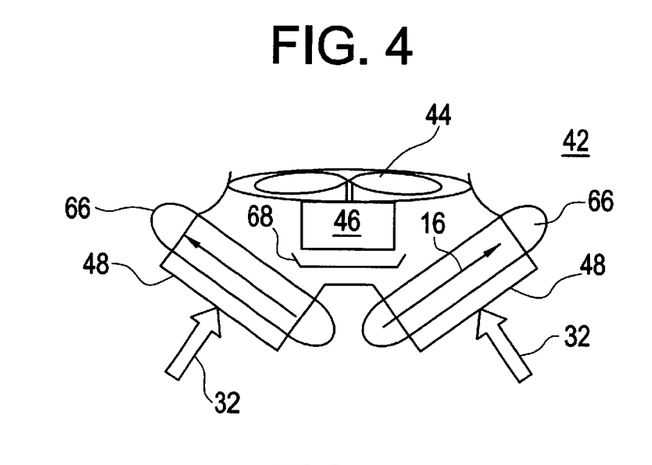
FIG. 4 is a partial cross-sectional view of an air-to-air intercooler with fan and motor.

It may be advantageous to position the air-to-air intercooler 42 and its associated fan 44 and fan motor 46 proximate a roof surface of a locomotive. FIG. 4 is a partial cross-sectional view of one layout of such equipment. The air-to-air intercooler 42 is formed with twin air-to-air heat exchangers 66 assembled into a V configuration. Combustion air 16 passes in heat exchange relationship with ambient air 32 in each of the cross-flow air-to-air heat exchangers 66, dropping the temperature of the combustion air 16 to about 120° F. from an air-to-water intercooler 40 outlet temperature of about 220° F. The flow of ambient air 32 is driven by suction fan 44, which in turn is driven by motor 46 mounted downstream of the air-to-air heat exchangers 66 within the stream of ambient air 32. Shutters 48 are provided upstream of the respective heat exchangers 66 for control of the ambient air flow rate. Manifold air temperature may be affected by controlling the quantity of ambient air 32 passing through the air-to-air intercooler 42. This may be accomplished in a number of ways. Fan motor 46 may be cycled on and off, or may be provided with multi-speed or variable speed capability. Fan 44 may be provided with variable-pitch blades. In order to avoid excessive cycling of the fan motor speed, the position of shutters 48 may be controlled to provide a desired degree of restriction in the ambient air flow path. Shutters 48 may be closed completely to eliminate even natural convection cooling of the air-to-air heat exchangers 66 during cold ambient or low engine power operation. When the shutters 48 are in any position other than fully open, the flow of ambient air 32 past fan motor 46 is restricted. Because the ambient air 32 provides cooling for motor 46 after having passed through the air-to-air heat exchangers 66, such restriction may result in the overheating of motor 46. To avoid overheating conditions, a cooling duct 68 is provided to deliver ambient air 32 to the fan motor 46 through a flow path other than through the air-to-air heat exchangers 66. A shutter, valve or other control mechanism (not shown) may be used to actively control flow through duct 68. Alternatively, flow through duct 68 may be passively controlled. For example, in one embodiment the suction pressure at the inlet of fan 44 increases as the shutters 48 are closed, thereby increasing the flow of ambient air 32 through cooling duct 68 in response to the closure of the shutters 48. Duct 68 will also serve to partially off-load the pressure loads on the fan blades when the fan 44 is rotating with the shutters 48 restricted, thereby further reducing the temperature of fan motor 46.

Figure 5:
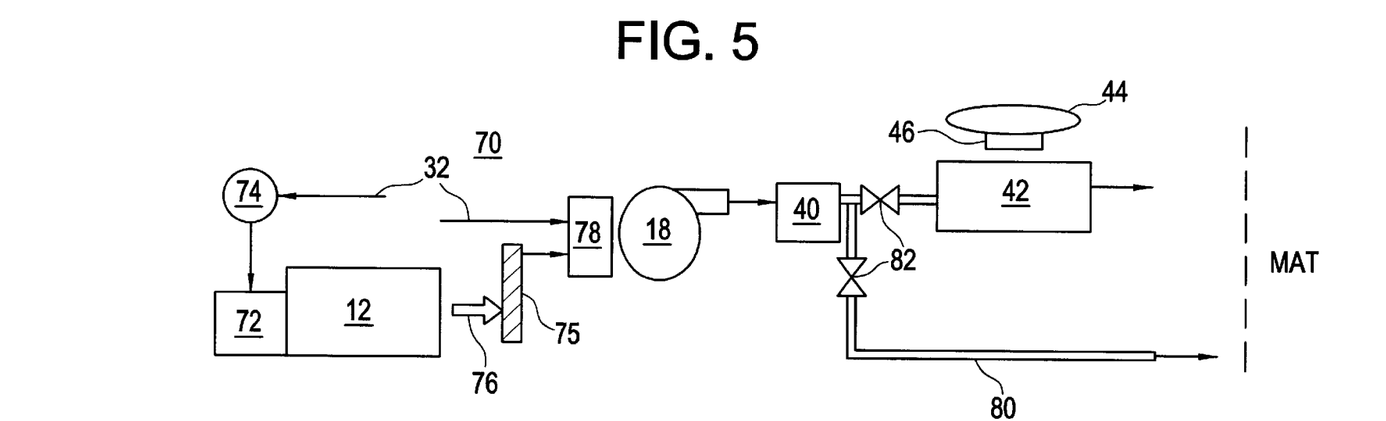
FIG. 5 is a schematic illustration of a manifold air temperature control system that may be used with the cooling apparatus of FIG. 1.

FIG. 5 is a schematic illustration of a manifold air temperature control system 70 that may be used with the cooling apparatus 10 of FIG. 1. Engine 12 is shown connected to an alternator 72. Ambient air 32 is provided to cool the alternator 72 by alternator blower 74. That air is heated to about 150° F. as it passes through the alternator 72 and into the engine compartment. A shutter 75 is used to select portions of ambient air 32 and the heated engine compartment air 76 to the inlet of turbocharger 18 through an air filter 78. The compressed air exiting the turbocharger 18 passes through the air-to-water intercooler 40 and is selectively delivered to either the air-to-air intercooler 42 or to a bypass duct 80 depending upon the respective positions of bypass flow control elements 82. The manifold air temperature control system 70 allows the designer/operator to control the manifold air temperature in a variety of ways. By controlling the position of shutters 75, the temperature of the air delivered to the inlet of turbocharger 18 can be varied from the ambient air temperature to the engine compartment air temperature. Control of the temperature and flow rate of coolant delivered to the air-to-water intercooler 40 will regulate the effect of that device on the temperature of the combustion air 16 passing there through. The combustion air may be heated or cooled by the air-to-water intercooler 40 as needed in response to the power demand and ambient operating conditions. Control of the speed of operation of fan 44 will regulate the affect of the air-to-air intercooler 42 on the temperature of the combustion air 16 passing there through. The position of shutters 48 may also be used to regulate the amount of ambient air provided to the air-to-air intercooler 42. Finally, the air-to-air intercooler 42 may be partially or completely removed from the combustion air flow stream by routing at least a portion of the combustion air 16 through bypass duct 80. This is accomplished by the operation of a flow control apparatus such as valves 82 or other such flow control elements. In addition to the temperature control effects of bypassing the air-to-air intercooler 42, the elimination of the air volume of the air-to-air intercooler 42 from the combustion air flow stream will provide a faster engine power transient in response to a rapid throttle position increase than would otherwise be achieved with the air-to-air intercooler 42 in the flow stream.

Figure 6:
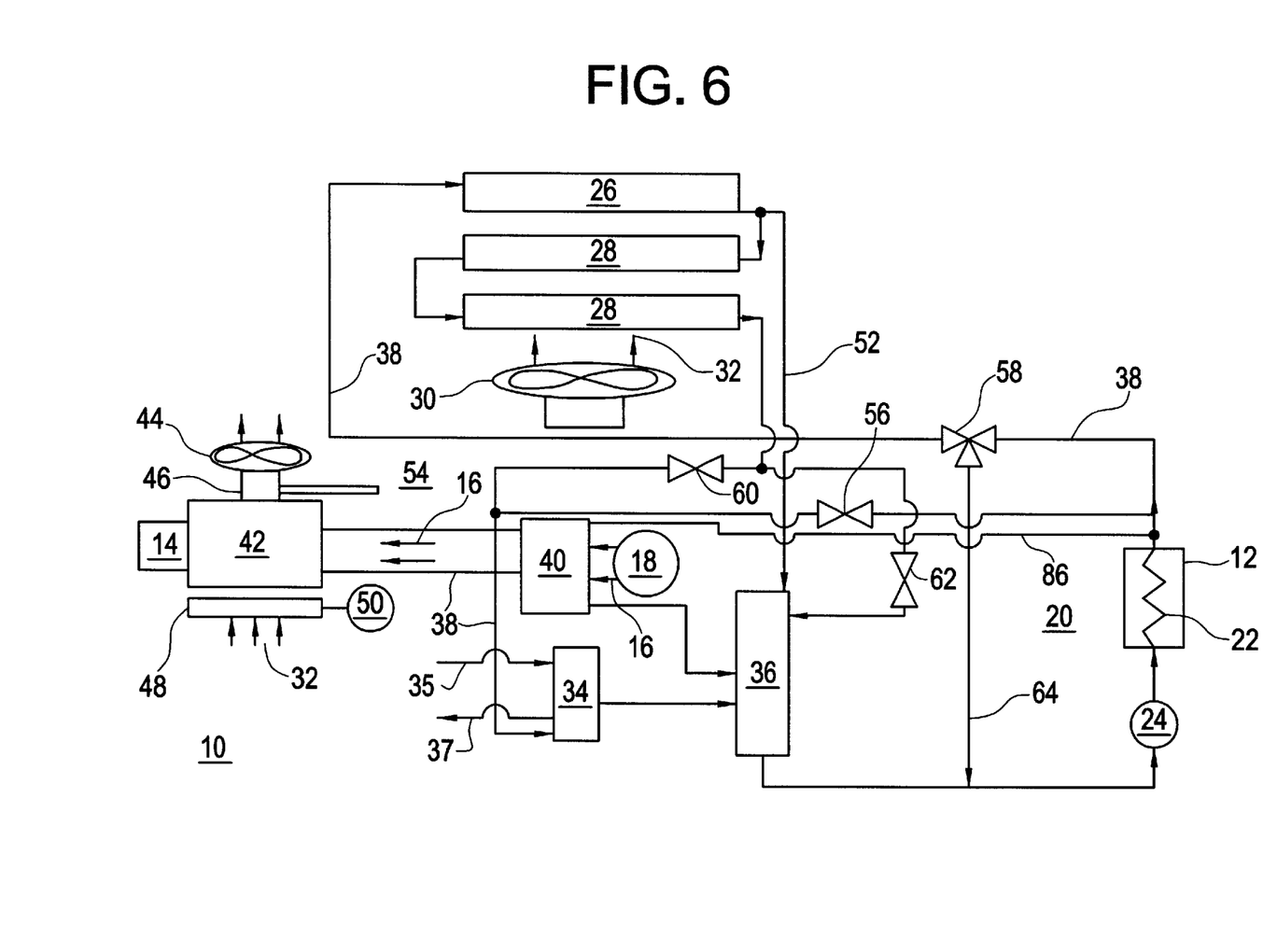
FIG. 6 is a schematic illustration of a further embodiment of a cooling apparatus for a turbocharged internal combustion engine.

An alternate embodiment of a cooling apparatus 84 is illustrated in schematic form in FIG. 6. Cooling apparatus 84 of FIG. 6 contains many of the same components as those of cooling apparatus 10 of FIGS. 1–3. Similar components are numbered consistently among the various figures. Cooling apparatus 84 is distinct from cooling apparatus 10 in that the air-to-water intercooler 40 is provided with a constant flow of coolant from the outlet of engine cooling passages 22 via conduit 86. The passive temperature damping provided by the air-to-water intercooler 40 facilitates improved MAT control. With this embodiment the system piping may be simpler because the water connection from the lube oil cooler 34 to the water-to-air intercooler 40 of FIG. 3 is replaced by a water connection from the lube oil cooler 34 to the water tank 36.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A cooling system for an internal combustion engine comprising:
   an intercooler receiving combustion air from a turbocharger, the intercooler comprising a liquid portion for exchanging heat between the combustion air and engine coolant, the intercooler further comprising an air portion for exchanging heat between the combustion air and ambient air;
   a radiator exchanging heat between the engine coolant and ambient air; and;
   valving directing engine coolant from an engine to the radiator and then on to the liquid portion of the intercooler in series in a first mode and directing at least a portion of the engine coolant from the engine directly to the liquid portion of the intercooler and thus bypassing the radiator in a second mode.

2. The cooling system of claim 1, wherein the valving further prevents the flow of engine coolant to the radiator in a third mode.

3. The cooling system of claim 1, further comprising a lube oil cooler fluidly connected upstream of the liquid portion of the intercooler for receiving the engine coolant from the radiator in the first mode and for receiving the engine coolant from the engine in the second mode.

4. A cooling system for an internal combustion engine providing enchanced cooling of engine lube oil, the system comprising:
   a radiator receiving engine coolant from an engine for cooling the engine coolant;
   a subcooler receiving engine coolant from the radiator and being exposed to a flow of ambient air, with the ambient air first flowing past the subcooler and then on to the radiator, with the subcooler further cooling the engine coolant received from the radiator; and a lube oil cooler receiving the engine coolant from the subcooler for enchanced cooling of the engine lube oil.

5. The cooling system of claim 4, further comprising an intercooler receiving a portion of the engine coolant from the subcooler.

6. The cooling system of claim 4, further comprising an intercooler receiving coolant from the engine bypassing the radiator, subcooler and lube oil cooler.

7. An apparatus for conditioning a flow of combustion air being supplied to the intake of a turbocharged internal combustion engine, the apparatus comprising:
 a control element for selecting between ambient air and heated ambient air as a source of combustion air intake to a turbocharger;
 an air-to-water intercooler receiving compressed combustion air from the turbocharger; and
 valving for selectively supplying coolant to the air-to-water intercooler at a temperature higher than that of the compressed combustion air passing through the air-to-water intercooler to heat the compressed combustion air in a heating mode, and supplying coolant to the air-to-water intercooler at a temperature lower than the compressed combustion air passing through the air-to-water intercooler to cool the compressed combustion air in a cooling mode.

8. The apparatus of claim 7, further comprising an air-to-air intercooler downstream of the air-to-water intercooler for receiving the compressed combustion air from the air-to-water intercooler.

9. The apparatus of claim 8, further comprising a bypass for selectively directing at least a portion of the compressed combustion air to bypass the air-to-air intercooler.

10. An apparatus for conditioning a flow of combustion air being supplied to the intake of an internal combustion engine, the apparatus comprising:
 an air-to-liquid heat exchanger disposed in the flow of combustion air for heat exchange between the combustion air and a liquid coolant; and
 an air-to-air heat exchanger disposed in the flow of combustion air downstream of the air-to-liquid heat exchanger for heat exchange between the combustion air and ambient air, and further comprising:
 a coolant circuit for delivering liquid coolant to the air-to-liquid heat exchanger; and
 wherein the coolant circuit comprises a control element for selecting the liquid coolant delivered to the air-to-liquid heat exchanger to be of a predetermined temperature relationship to that of the combustion air entering the air-to-liquid intercooler.

11. An apparatus for conditioning a flow of combustion air being supplied to the intake of an internal combustion engine, the apparatus comprising:
 an air-to-liquid heat exchanger disposed in the flow of combustion air for heat exchange between the combustion air and a liquid coolant; and
 an air-to-air heat exchanger disposed in the flow of combustion air downstream of the air-to-liquid heat exchanger for heat exchange between the combustion air and ambient air, further comprising:
 a motor powered fan for moving ambient air through the air-to-air heat exchanger; and
 a flow path for supplying ambient air to the motor to ventilate the motor along a path other than through the air-to-air heat exchanger.

12. The apparatus of claim 4, further comprising a shutter disposed within a flow path of the ambient air upstream of the air-to-air heat exchanger, the shutter adapted to control a flow of ambient air passing through the air-to-air heat exchanger.

13. A cooling system for an internal combustion engine, the cooling system comprising:
 a liquid coolant circuit comprising an air-to-liquid intercooler for providing heat exchange between a liquid coolant and a flow of combustion air being supplied to an intake of an internal combustion engine; and
 an air-to-air intercooler disposed within the flow of combustion air downstream of the air-to-liquid intercooler for providing heat exchange between the flow of combustion air and ambient air;
 wherein the liquid coolant circuit further comprises at least one valve for controlling the liquid coolant delivered to the air-to-liquid intercooler to have a predetermined temperature relationship with the combustion air entering the air-to-liquid intercooler.

14. A cooling system for an internal combustion engine, the cooling system comprising:
 a liquid coolant circuit comprising an air-to-liquid intercooler for providing heat exchange between a liquid coolant and a flow of combustion air being supplied to an intake of an internal combustion engine; and
 an air-to-air intercooler disposed within the flow of combustion air downstream of the air-to-liquid intercooler for providing heat exchange between the flow of combustion air and ambient air; further comprising:
 a fan motor disposed downstream of the air-to-air intercooler for driving a fan for forcing a flow of ambient air through the air-to-air intercooler; and
 a duct for supplying a flow of ambient air to ventilate the fan motor along a flow path other than that through the air-to-air intercooler.

15. The cooling system of claim 8, further comprising a shutter associated with the air-to-air intercooler and having a plurality of positions for controlling the flow of ambient air through the air-to-air intercooler, the flow of ambient air to ventilate the fan motor being responsive to the shutter position.

16. A cooling system for an internal combustion engine, the cooling system comprising:
 a liquid coolant circuit comprising an air-to-liquid intercooler for providing heat exchange between a liquid coolant and a flow of combustion air being supplied to an intake of an internal combustion engine; and
 an air-to-air intercooler disposed within the flow of combustion air downstream of the air-to-liquid intercooler for providing heat exchange between the flow of combustion air and ambient air;
 wherein the liquid coolant circuit further comprises:
  a radiator for receiving coolant heated by the engine;
  a subcooler for receiving coolant from the radiator; and
  a lubricant cooler for receiving coolant from the subcooler and for providing heat exchange between the coolant and engine lubricant.

17. The cooling system of claim 10, wherein the air-to-liquid intercooler receives coolant from an outlet of the lubricant cooler.

18. A cooling system for an internal combustion engine, the cooling system comprising:
 a liquid coolant circuit comprising an air-to-liquid intercooler for providing heat exchange between a liquid coolant and a flow of combustion air being supplied to an intake of an internal combustion engine; and an air-to-air intercooler disposed within the flow of combustion air downstream of the air-to-liquid intercooler for providing heat exchange between the flow of combustion air and ambient air;

wherein the liquid coolant circuit further comprises an interconnection between the air-to-liquid intercooler and an engine cooling device for providing a supply of coolant from the engine cooling device to the air-to-liquid intercooler; and wherein the liquid coolant circuit further comprises a lubricant cooler for providing heat exchange between the coolant and an engine lubricant, the lubricant cooler connected between the engine cooling device and the air-to-liquid intercooler.

19. A method of conditioning the combustion air being supplied to an internal combustion engine, the method comprising:

directing compressed combustion air from a turbocharger to an air-to-liquid heat exchanger for heat exchange with a liquid coolant of an engine cooling system; and directing the compressed combustion air from the air-to-liquid heat exchanger to an air-to-air heat exchanger for heat exchange with ambient air;

further comprising providing at least one valve in the engine cooling system for controlling a temperature of the liquid coolant provided to the air-to-liquid heat exchanger to have a predetermined temperature relationship with the combustion air entering the air-to-liquid intercooler.

20. A method of conditioning the combustion air being supplied to an internal combustion engine, the method comprising:

directing compressed combustion air from a turbocharger to an air-to-liquid heat exchanger for heat exchange with a liquid coolant of an engine cooling system; and directing the compressed combustion air from the air-to-liquid heat exchanger to an air-to-air heat exchanger for heat exchange with ambient air;

further comprising controlling the heat exchange between the combustion air and the ambient air by one of controlling the speed of a fan forcing ambient air through the air-to-air heat exchanger and controlling a position of a shutter disposed within a flow stream of the ambient air.

21. A method of conditioning the combustion air being supplied to an internal combustion engine, the method comprising:

directing compressed combustion air from a turbocharger to an air-to-liquid liquid heat exchanger for heat exchange with a liquid coolant of an engine cooling system; and directing the compressed combustion air from the air-to-liquid heat exchanger to an air-to-air heat exchanger for heat exchange with ambient air;

further comprising:

forcing ambient air through the air-to-air heat exchanger with a suction fan driven by a suction fan motor; and providing cooling air to ventilate the suction fan motor along a flow path other than that through the air-to-air heat exchanger.

22. A method of conditioning the combustion air being supplied to an internal combustion engine, the method comprising:

directing compressed combustion air from a turbocharger to an air-to-liquid heat exchanger for heat exchange with a liquid coolant of an engine cooling system; and directing the compressed combustion air from the air-to-liquid heat exchanger to an air-to-air heat exchanger for heat exchange with ambient air;

forming the engine cooling system to include an engine water jacket; and directing coolant from the engine water jacket to the air-to-liquid heat exchanger;

further comprising the directing coolant from the engine water jacket to the air-to-liquid heat exchanger through an engine lubricant cooler.

23. The method of claim 21, further comprising directing the coolant from the engine water jacket to the engine lubricant cooler through a radiator and a subcooler in series.

24. A method of conditioning the combustion air being supplied to an internal combustion engine, the method comprising:

directing compressed combustion air from a turbocharger to an air-to-liquid heat exchanger for heat exchange with a liquid coolant of an engine cooling system; and directing the compressed combustion air from the air-to-liquid heat exchanger to an air-to-air heat exchanger for heat exchange with ambient air;

forming the engine cooling system to include an engine water jacket; and directing coolant from the engine water jacket to the air-to-liquid heat exchanger;

further comprising directing coolant from the engine water jacket to an engine lubricant cooler in parallel to the coolant being directed from the engine water jacket to the air-to-liquid heat exchanger.

25. A method of conditioning the combustion air being supplied to an internal combustion engine, the method comprising:

directing compressed combustion air from a turbocharger to an air-to-liquid heat exchanger for heat exchange with a liquid coolant of an engine cooling system; and directing the compressed combustion air from the air-to-liquid heat exchanger to an air-to-air heat exchanger for heat exchange with ambient air;

further comprising directing liquid coolant to the air-to-liquid heat exchanger through an engine lubricant cooler.

26. The method of claim 24, further comprising directing the coolant to the engine lubricant cooler through a radiator and a subcooler in series.

27. An internal combustion engine comprising:

an intake manifold for receiving combustion air into an engine;

a coolant loop for circulating coolant for heat exchange between the engine and ambient air;

an air-to-liquid intercooler having a combustion air side forming a first portion of a flow path of the combustion air to the intake manifold and having a liquid side forming a portion of the coolant loop for heat exchange between the combustion air and the coolant; and an air-to-air intercooler having a combustion air side forming a second portion of the flow path of the combustion air disposed downstream of the first portion and having an ambient air side for heat exchange between the combustion air and ambient air;

further comprising a bypass for selectively directing the combustion air around the air-to-air intercooler.

28. An internal combustion engine comprising:

an intake manifold for receiving combustion air into an engine;

a coolant loop for circulating coolant for heat exchange between the engine and ambient air;

an air-to-liquid intercooler having a combustion air side forming a first portion of a flow path of the combustion air to the intake manifold and having a liquid side forming a portion of the coolant loop for heat exchange between the combustion air and the coolant; and an air-to-air intercooler having a combustion air side forming a second portion of the flow path of the combustion air disposed downstream of the first portion and having an ambient air side for heat exchange between the combustion air and ambient air;

further comprising:

a motor powered fan for delivery of ambient air to the air-to-air intercooler; and a duct for delivering air to ventilate the motor along a flow path other than that through the air-to-air intercooler.

29. An internal combustion engine comprising:

an intake manifold for receiving combustion air into an engine;

a coolant loop for circulating coolant for heat exchange between the engine and ambient air;

an air-to-liquid intercooler having a combustion air side forming a first portion of a flow path of the combustion air to the intake manifold and having a liquid side forming a portion of the coolant loop for heat exchange between the combustion air and the coolant; and an air-to-air intercooler having a combustion air side forming a second portion of the flow path of the combustion air disposed downstream of the first portion and having an ambient air side for heat exchange between the combustion air and ambient air;

further comprising:

radiator and a subcooler having respective coolant sides forming a portion of the coolant loop and connected in series relationship, and having respective ambient air sides, a flow of ambient air passing respectively past the subcooler ambient air side and the radiator ambient air side; and a lubricant cooler having a coolant side forming a portion of the coolant loop disposed downstream of the subcooler coolant side and having an engine lubricant side.

30. The engine of claim 29, wherein the air-to-liquid intercooler receives coolant from an outlet of the lubricant cooler.

* * * * *